(12) United States Patent
Nishida et al.

(10) Patent No.: US 9,160,973 B2
(45) Date of Patent: Oct. 13, 2015

(54) BROADCAST RECEIVING APPARATUS AND BROADCAST RECEIVING METHOD

(75) Inventors: Ryuji Nishida, Kawasaki (JP); Yoshihiro Saga, Ichikawa (JP); Kenichi Morikawa, Kawasaki (JP); Kazuhiko Nakazawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1202 days.

(21) Appl. No.: 12/484,663

(22) Filed: Jun. 15, 2009

(65) Prior Publication Data

US 2009/0310780 A1 Dec. 17, 2009

(30) Foreign Application Priority Data

Jun. 16, 2008 (JP) ................. 2008-156901

(51) Int. Cl.
| | | |
|---|---|---|
| *G06Q 99/00* | (2006.01) | |
| *H04N 7/167* | (2011.01) | |
| *H04N 5/913* | (2006.01) | |
| *H04N 21/2389* | (2011.01) | |
| *H04N 21/258* | (2011.01) | |
| *H04N 21/433* | (2011.01) | |
| *H04N 21/4385* | (2011.01) | |
| *H04N 21/4408* | (2011.01) | |
| *G06Q 20/12* | (2012.01) | |

(52) U.S. Cl.
CPC ............. *H04N 7/1675* (2013.01); *H04N 5/913* (2013.01); *H04N 21/23895* (2013.01); *H04N 21/2585* (2013.01); *H04N 21/4334* (2013.01); *H04N 21/43853* (2013.01); *H04N 21/4408* (2013.01); *G06Q 20/1235* (2013.01); *H04N 2005/91364* (2013.01)

(58) Field of Classification Search
CPC ....... H04L 9/08; H04L 9/0822; H04L 9/0861; H04L 9/00; H04N 7/167; H04N 7/1675; G06Q 20/1235
USPC .................... 705/51, 59; 725/25, 31; 380/239
See application file for complete search history.

(56) References Cited

U.S. PATENT DOCUMENTS

| | | | |
|---|---|---|---|
| 7,035,827 B2 * | 4/2006 | Ezaki ............................. 705/51 |
| 7,401,232 B2 * | 7/2008 | Ono et al. ..................... 713/193 |
| 2002/0120574 A1 * | 8/2002 | Ezaki ............................. 705/51 |
| 2005/0021985 A1 * | 1/2005 | Ono et al. ..................... 713/193 |
| 2006/0095935 A1 * | 5/2006 | Ooi et al. ........................ 725/25 |
| 2006/0126839 A1 * | 6/2006 | Koike et al. .................. 380/240 |
| 2008/0235517 A1 * | 9/2008 | Ohmori et al. ................ 713/187 |

FOREIGN PATENT DOCUMENTS

| | | |
|---|---|---|
| JP | 10-191302 | 7/1998 |
| JP | 2000-115091 | 4/2000 |
| JP | 2001-285820 | 10/2001 |
| JP | 2006-074209 A | 3/2006 |
| JP | 2006-129244 | 5/2006 |
| JP | 2007-028142 A | 2/2007 |

* cited by examiner

*Primary Examiner* — James D Nigh
(74) *Attorney, Agent, or Firm* — Canon USA, Inc., IP Division

(57) ABSTRACT

Before a device key generation procedure is updated in response to execution of revocation, a recorded transport stream is decrypted using an unupdated device key and is stored in a memory unit after being re-encrypted. In this manner, broadcast programs that are recorded before the revocation can be viewed while maintaining a copyright protection function.

8 Claims, 6 Drawing Sheets

BROADCAST RECEIVING APPARATUS AND BROADCAST RECEIVING METHOD

BACKGROUND OF THE INVENTION

1. Field of the Invention

The present invention relates to a broadcast receiving apparatus and a broadcast receiving method for receiving a digital broadcast signal and recording/reproducing the received broadcast content.

2. Description of the Related Art

Measures for copyright protection are sometimes taken in digital broadcasting. For example, a system for transmitting scrambled content and allowing only viewing-contract-based valid broadcast receiving apparatuses to descramble the scrambled content is employed in digital broadcasting. In Japan, a conditional access system (CAS) that uses an integrated circuit (IC) card is adopted.

Identification of valid broadcast receiving apparatuses, secure encryption and transmission of content, and successful descrambling processing of the valid broadcast receiving apparatuses are important in the conditional access system. Here, the valid broadcast receiving apparatuses indicate apparatuses that are authorized to have a copyright protection function and have a valid viewing contract. In the case of paid broadcasting, the valid broadcast receiving apparatuses have to be successfully charged for viewing.

An IC card stores an ID number unique to the IC card and master key information for use in descrambling of content. Valid broadcast receiving apparatuses are identified using the information stored in the card. Content is encrypted with three keys, which include the master key information.

On the other hand, a new conditional access system that does not use an IC card is additionally standardized. Hereinafter, this new standard is referred to as a rights management and protection (RMP) system. Digital terrestrial broadcast receiving apparatuses and mobile broadcast receiving terminals may be designed in accordance with the RMP system.

A specific method of the RMP system is as described below. An entitlement management message (EMM) containing encrypted master key information is transmitted over a broadcast wave instead of storing the master key information in an IC card. The EMM is data contained in a payload of a transport stream (TS) packet and carries device key information and work key information for each model of broadcast receiving apparatuses. The broadcast receiving apparatuses extract key information (device key) corresponding to an ID of each model from the EMM. The device key information contained in the EMM is encrypted. A device key is generated using a specific device key generation procedure. The device key generation procedure indicates, for example, software for executing an algorithm to generate a device key or hardware for executing predetermined processing to generate a device key.

Content is encrypted with three keys. A device key, a work key, and a scramble key are used to descramble the encrypted content. The work key is encrypted with the device key and is contained in the EMM. The scramble key is encrypted with the work key, contained in an entitlement control message (ECM), and transmitted over a broadcast wave. Like the EMM, the ECM is data contained in a payload of a transport stream (TS) packet and carries scramble key information and program information commonly used by all broadcast receiving apparatuses. In this manner, valid broadcast receiving apparatuses sequentially decrypt encrypted key information based on the device key, thereby realizing viewing of the content.

When leaked device key information is misused to violate copyright protection, a measure for updating key information contained in an EMM and transmitting the updated key information is taken. This measure is referred to as revoke. Since the revoke prevents the leaked device key information from being misused, content is securely transmitted thereafter. However, when a device key generation procedure leaks, an updated device key can be generated in accordance with the leaked device key generation procedure even if key information contained in the EMM is updated. In such a case, the EMM is updated so that none of revoke-target broadcast receiving apparatuses can generate a key using the leaked device key generation procedure.

Once the EMM is updated, the revoke-target broadcast receiving apparatuses cannot realize viewing of broadcast content thereafter. To permit viewing of the broadcast content again, the device key generation procedure is updated to more-secure hard-to-leak one. For example, a method for updating key generation software included in a broadcast receiving apparatus is employed (see, for example, Japanese Patent Laid-Open No. 2006-129244). Since invalid broadcast receiving apparatuses cannot update the key generation procedure, following content can be securely transmitted.

On the other hand, apparatuses for storing a digital broadcast program in a storage device, such as a hard disk, and realizing repeated viewing of the program are also put to practical use. Digital broadcasting employs a moving picture experts group (MPEG) 2 system and uses a transport stream (hereinafter, referred to as "TS"). Streams of video, audio, data for data broadcasting, transmission control information, and reception control information are dividedly contained in each of TS packets and are transmitted according to time-division multiplexing. If the apparatuses store the received TS data on a recording medium as it is, the apparatuses can store the TS data without deteriorating the image quality.

When the TS data is stored as scrambled TS data, the data has a copyright protection function equivalent to that of a broadcast wave. Even if the TS data cannot be descrambled due to lack of key information stored in an IC card or the like, the scrambled TS data can be stored as it is. Hereinafter, it is assumed that recorded TS data indicates recorded data that has not undergone descrambling.

As in the case of viewing of a broadcast wave, recorded TS data is descrambled at the time of reproduction and viewing of a recorded broadcast program. At this time, a device key, a work key, and a scramble key extracted from an EMM and an ECM of the recorded TS data are decrypted to perform descrambling.

Once a device key generation procedure is updated in response to discovery of an invalid broadcast receiving apparatus in the RMP system, viewing of content that has been recorded as recorded TS data is no longer available.

This is because a device key generated from an EMM of the recorded TS data has been already revoked. More specifically, even valid viewers not invalidly violating a copyright protection function can no longer view the TS-format content recorded before the revoke.

SUMMARY OF THE INVENTION

The present invention provides a broadcast receiving apparatus for realizing viewing of content recorded before execution of revoke while maintaining a copyright protection function even if the broadcast receiving apparatus is subject to the revoke.

According to an aspect of the present invention, a broadcast receiving apparatus for receiving a digital broadcast signal to realize viewing of a content-protected broadcast program includes a memory unit configured to store program data of the content-protected broadcast program, a revoke detection unit configured to detect revoke, a conditional access processing unit configured to convert data related to scrambling of the program data of the content-protected broadcast program read out from the memory unit, and a control unit configured to control the memory unit and the conditional access processing unit so that the conditional access processing unit converts, in a case where the revoke detection unit detects the revoke, the data related to scrambling of the program data of the content-protected broadcast program stored in the memory unit and stores again the program data corresponding to the converted data in the memory unit before the conditional access processing unit is updated.

According to the aspect of the present invention, even if a valid viewer updates a device key generation procedure after a broadcast receiving apparatus is subjected to revoke, the broadcast receiving apparatus can realize viewing of a broadcast program recorded before the revoke while maintaining the copyright protection function.

Further features of the present invention will become apparent from the following description of exemplary embodiments with reference to the attached drawings.

DESCRIPTION OF THE EMBODIMENTS

First Exemplary Embodiment

Figure 1:
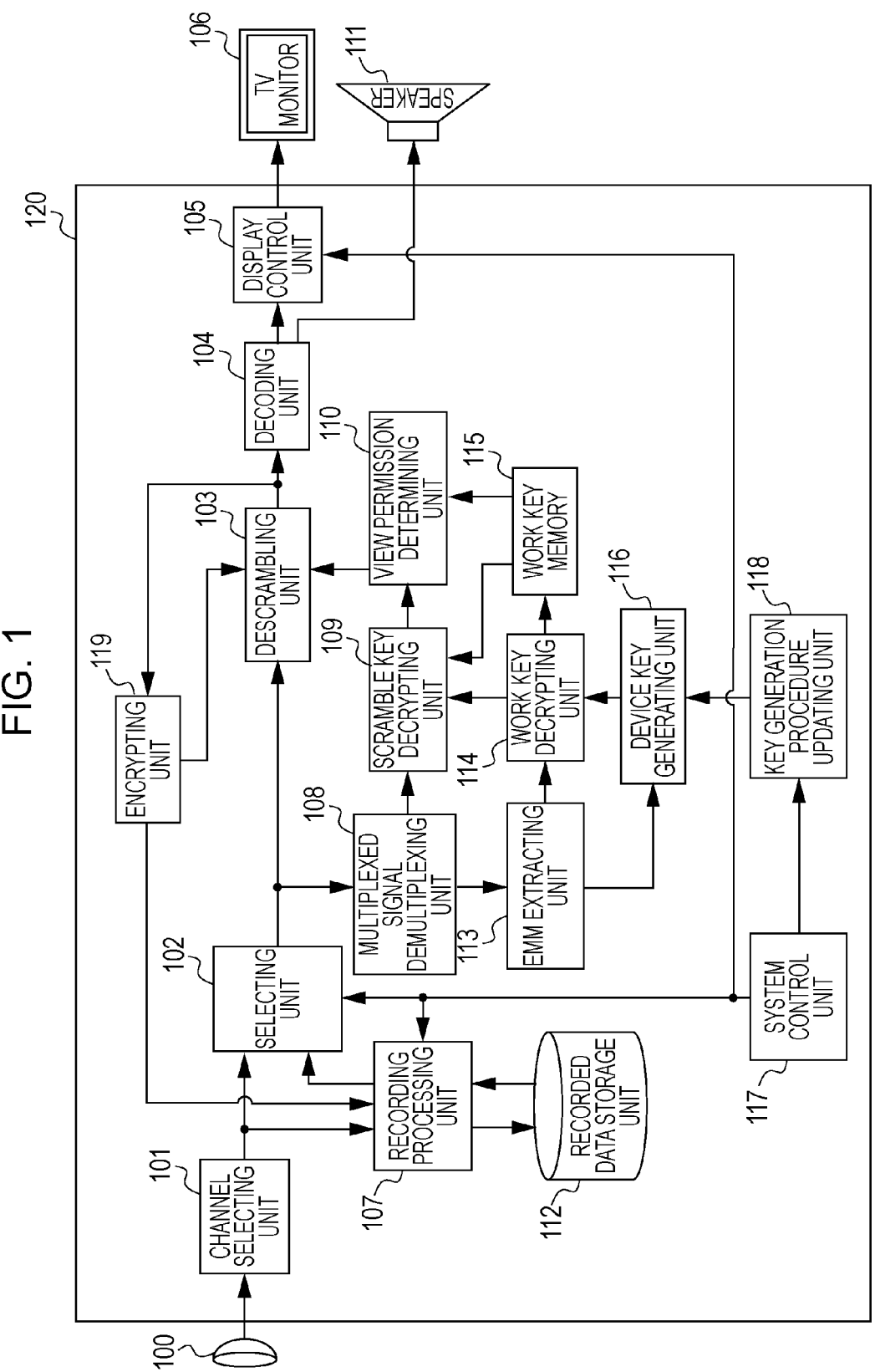
FIG. 1 is a block diagram showing a configuration of a broadcast receiving apparatus according to a first exemplary embodiment of the present invention.

FIG. 1 is a block diagram showing a configuration of a broadcast receiving apparatus according to an exemplary embodiment of the present invention. A digital broadcast wave received by a reception antenna 100 is supplied to a broadcast receiving apparatus 120 as a digital broadcast signal. Video data and audio data generated from the digital broadcast signal are output to a television (TV) monitor 106 and a speaker 111, respectively. Viewers can view the digital broadcast content through the TV monitor 106 and the speaker 111.

A channel selecting unit 101 selects program data of a desired broadcast program from the supplied digital broadcast signal. The program data includes video data, audio data, and information data. A selecting unit 102 selects viewing of a received broadcast program or viewing of a recorded broadcast program in accordance with a viewer's instruction. Received data, which is program data of a received content-protected broadcast program, and recorded data, which is program data of a recorded broadcast program, are scrambled transport stream (TS) data. A descrambling unit 103 descrambles the TS data using a scramble key. The descrambled TS data is decoded by a decoding unit 104 and is output as video data and audio data. The broadcast receiving apparatus 120 has a recording function and can store multiplexed TS data including an EMM and an ECM as recorded data. The channel selecting unit 101 selects a broadcast program to be recorded and outputs TS data of the selected broadcast program. The TS data is supplied to a recording processing unit 107. The recording processing unit 107 performs predetermined processing, such as copyright protection control. The processed TS data is stored in a recorded data storage unit (corresponding to a memory unit) 112, such as, for example, a hard disk drive (HDD). Although it is described that the broadcast receiving apparatus 120 has the recording function herein, the recording function may be included in an external device.

Conditional access processing is executed by a conditional access processing section (corresponding to a conditional access processing unit) including following units. More specifically, the conditional access processing section includes a scramble key decrypting unit (corresponding to a scramble key decrypting unit) 109, a view permission determining unit 110, an EMM extracting unit 113, a work key decrypting unit (corresponding to a work key decrypting unit) 114, a work key memory 115, a device key generating unit (corresponding to a device key generating unit) 116, a key generation procedure updating unit (corresponding to a key generating unit updating unit) 118, and an encrypting unit (corresponding to an encrypting unit) 119.

A system control unit (corresponding to a control unit) 117, such as a microcomputer, controls each unit so that the units operate in cooperation with each other. When the device key generation procedure is updated in response to execution of revoke, the key generation procedure updating unit 118 controls the device key generating unit 116 to execute the update.

In the RMP system that does not use an IC card, it is important to enhance the security of a device key, from which a key used in descrambling is generated. According to the RMP system, a unique device ID and a unique device key are assigned to each model of broadcast receiving apparatuses. An EMM contains encrypted device key information and is multiplexed onto a broadcast wave. A multiplexed signal demultiplexing unit (corresponding to a demultiplexing unit) 108 demultiplexes the EMM from received data. Since the EMM contains key information of all broadcast receiving apparatuses, the EMM extracting unit 113 extracts only an EMM containing device key information of this broadcast receiving apparatus.

The extracted EMM is supplied to the device key generating unit 116. The device key generating unit 116 generates a device key using a device key generation procedure. When the device key generation processing is realized by software, the device key generation procedure indicates a key generation algorithm.

When the device key or the key generation algorithm leaks, revoke is executed. Since the EMM and ECM contain viewing control information, a broadcasting service provider updates information of the EMM and ECM to stop the use of the leaked device key. In response to the update of the EMM and ECM information, the leaked device key or the device key that is generated using the leaked device key generation procedure is invalidated.

Since the device key is common to each model of broadcast receiving apparatuses, execution of the revoke invalidates device keys of other broadcast receiving apparatuses of the same model as that of the broadcast receiving apparatus having caused the leakage. As a result, valid viewers using the other broadcast receiving apparatuses can no longer view a broadcast program. Accordingly, upon detecting the revoke, the key generation procedure updating unit 118 updates the device key generating procedure to one corresponding to the updated EMM. More specifically, in the case where the device key generation procedure is realized by software, the software is updated. The device key generation procedure may be realized as hardware. In such a case, update of the device key generation procedure is realized by replacing hardware.

A revoke detecting unit (corresponding to a revoke detection unit), not shown, analyzes revoke information contained in an EMM, thereby detecting execution of revoke.

Viewers can successfully view programs broadcasted after the update of the device key generation procedure. Since invalid broadcast receiving apparatuses that use the leaked key cannot update the device key generation procedure, programs broadcasted after the update cannot be viewed with the invalid broadcast receiving apparatuses. The updated device key generation procedure has to satisfy a condition that the security is improved against the leakage.

On the other hand, reproduction of programs recorded before the update of the device key generation procedure is not available because recorded TS data contains unupdated EMM information and does not compliant with the updated device key generation procedure. Since this affects all of broadcast receiving apparatuses and recording apparatuses subjected to the update of the device key generation procedure, the recorded programs cannot be reproduced regardless of whether invalid use is done or not.

In this exemplary embodiment, recorded TS data is descrambled in response to detection of execution of revoke using the unupdated device key generation procedure before update of the device key generation procedure.

Furthermore, the descrambled TS data is re-encrypted and stored by the broadcast receiving apparatus 120.

More specifically, the descrambled TS data is fed back to the recording processing unit 107 through the encrypting unit 119. The system control unit 117 controls the data flow to this path upon detecting execution of the revoke.

Figure 2:
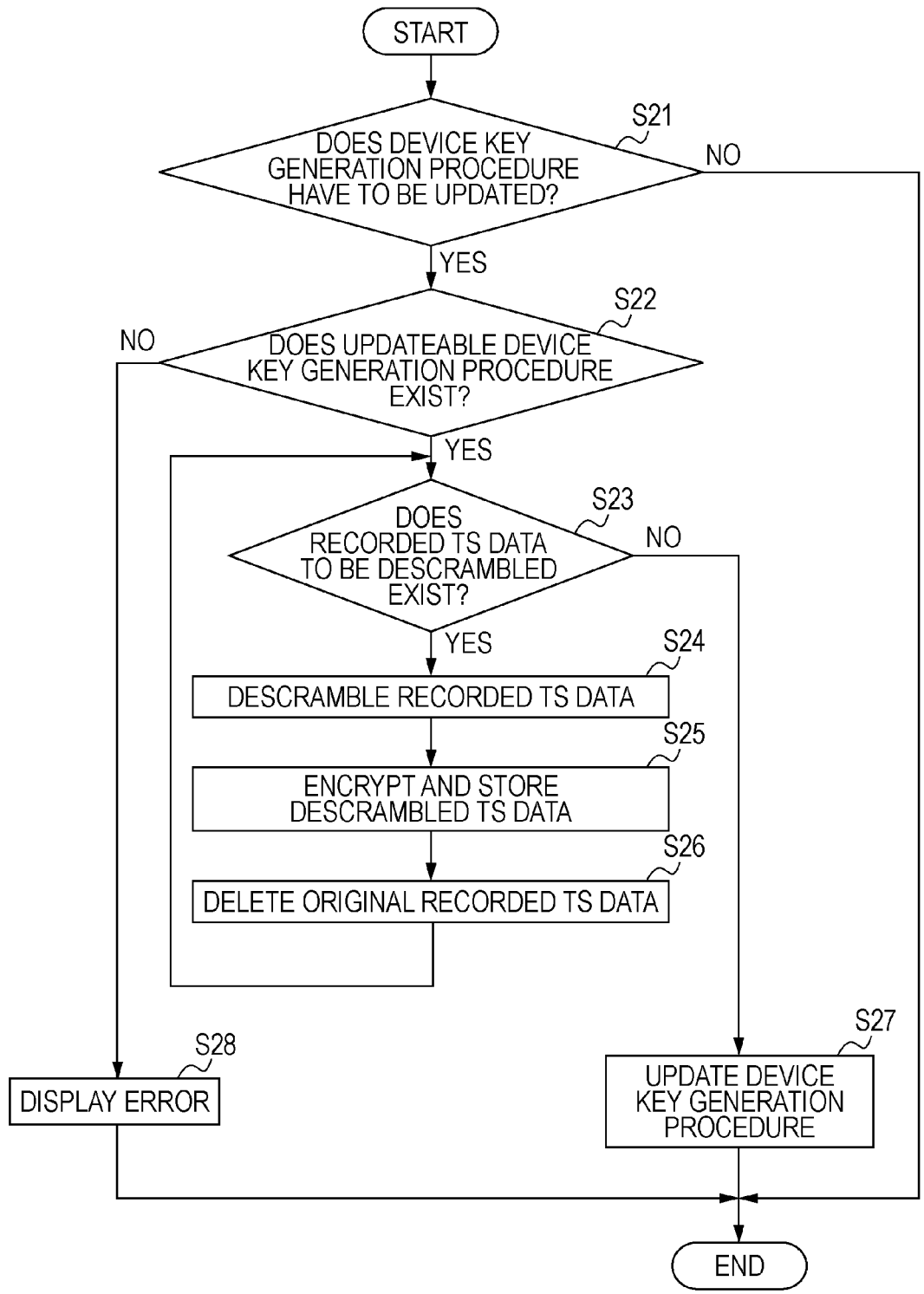
FIG. 2 is a flowchart showing an operation executed by a broadcast receiving apparatus according to a first exemplary embodiment of the present invention at the time of update of a device key generation procedure.

FIG. 2 is a flowchart regarding processing executed on recorded TS data when a device key generation procedure is updated in response to execution of revoke. Whether the device key generation procedure has to be updated is first determined (S21). If revoke is detected and descrambling is not successfully executed, it is determined that the update is needed. If the update is not needed (NO at S21), the process terminates. If the update is needed (YES at S21), whether an updateable device key generation procedure exists is determined (S22). If the updateable device key generation procedure does not exist (NO at S22), an error is displayed at S28. The process then terminates.

If the updateable device key generation procedure exists (YES at S22), whether recorded TS data to be descrambled exists in the recorded data storage unit 112 is detected (S23). Absence of the recorded TS data indicates that data using the unupdated device key generation procedure does not exist. Thus, the process terminates after the device key generation procedure is updated (S27).

If it is determined that the recorded TS data to be descrambled exists (YES at S23), steps starting from S24 are executed. The recorded TS data is descrambled using the unupdated device key generation procedure (S24). The encrypting unit 119 then encrypts and stores the descrambled TS data (S25). More specifically, the descrambled TS data is re-encrypted in order to store the TS data again without damaging a copyright protection function. For example, an encryption key unique to the broadcast receiving apparatus can be used in the encryption executed by the encrypting unit 119. When the encrypted TS data is viewed, the encryption key is supplied to the descrambling unit 103 to execute decryption. Since the original recorded TS data is no longer needed, the original recorded TS data is deleted (S26).

Processing at S24 to S26 is executed on all of scrambled recorded TS data stored in the recorded data storage unit 112. After the recorded TS data to be descrambled no longer exists (NO at S23), the device key generation procedure is updated (S27).

In the above-described manner, the recorded TS data that is converted at the time of update of the device key generation procedure can be decrypted without depending on the updated device key. Since the TS data is encrypted with the encryption key belonging to the broadcast receiving apparatus instead of the device key information, the copyright protection function is maintained.

Although undecoded TS data is re-encrypted and stored in this exemplary embodiment, uncompressed decoded TS data may be re-compressed, re-encrypted, and stored.

Second Exemplary Embodiment

Figure 3:
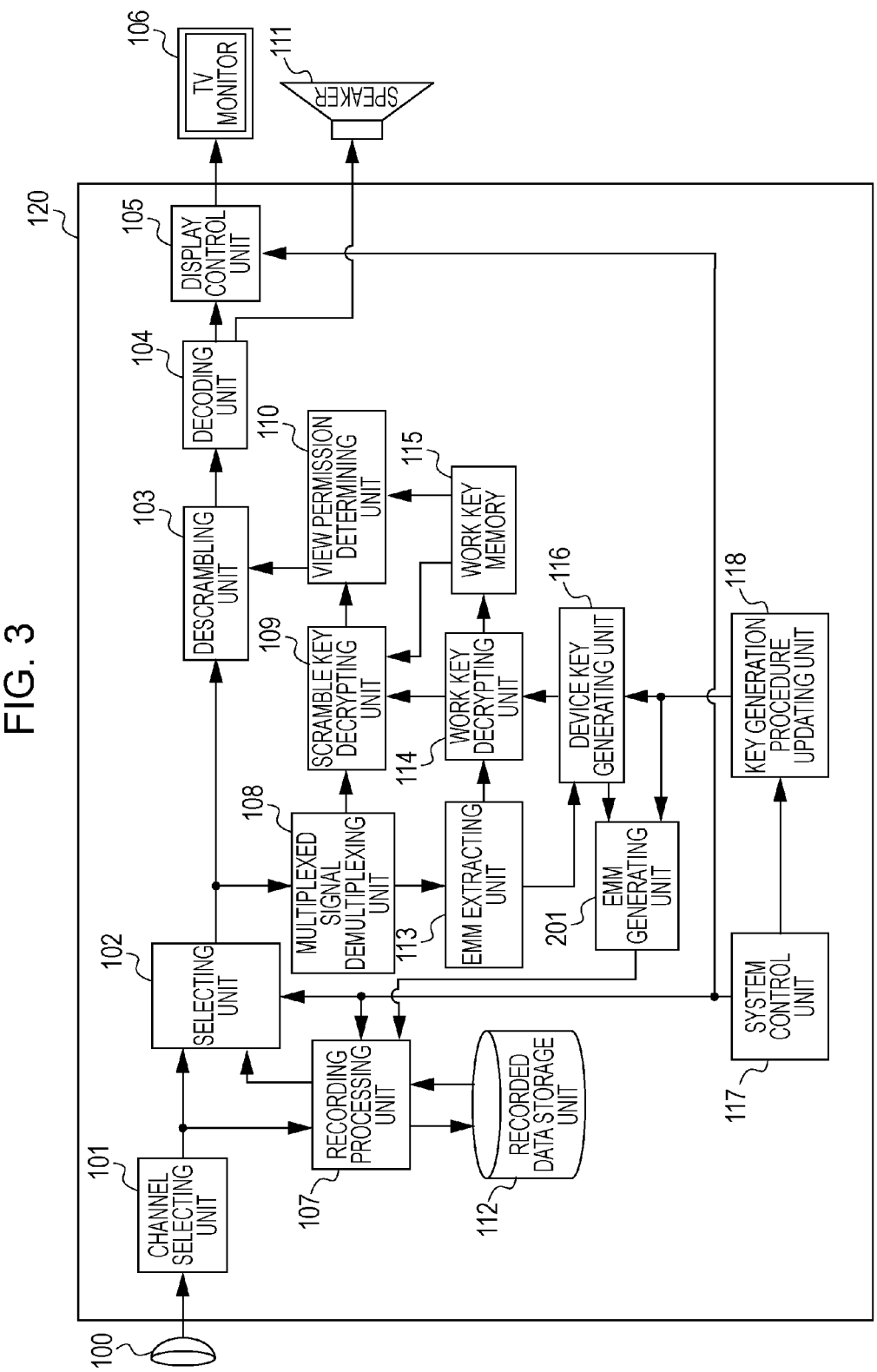
FIG. 3 is a block diagram showing a configuration of a broadcast receiving apparatus according to a second exemplary embodiment of the present invention.

FIG. 3 is a block diagram showing another configuration of a broadcast receiving apparatus according to an exemplary embodiment of the present invention.

Only a configuration different from that of the first exemplary embodiment will be described below.

In this exemplary embodiment, the encrypting unit 119 shown in FIG. 1 is deleted and an EMM generating unit 201 is added. The EMM generating unit 201 has an inverse conversion function for inversely converting an EMM corresponding to an updated device key generation procedure to generate a device key used in descrambling.

More specifically, the EMM generating unit 201 performs EMM inverse conversion using the updated device key generation procedure and an unupdated device key before generating an updated device key using the updated device key generation procedure. The EMM generating unit 201 then replaces an EMM of recorded TS data with the inversely-converted updated EMM. At the time of reproduction of the recorded TS data, an conditional access processing section sequentially generates the unupdated device key, an unupdated work key, an unupdated scramble key using the device key generation procedure updated based on the updated EMM, whereby the recorded TS data can be descrambled.

Figure 4:
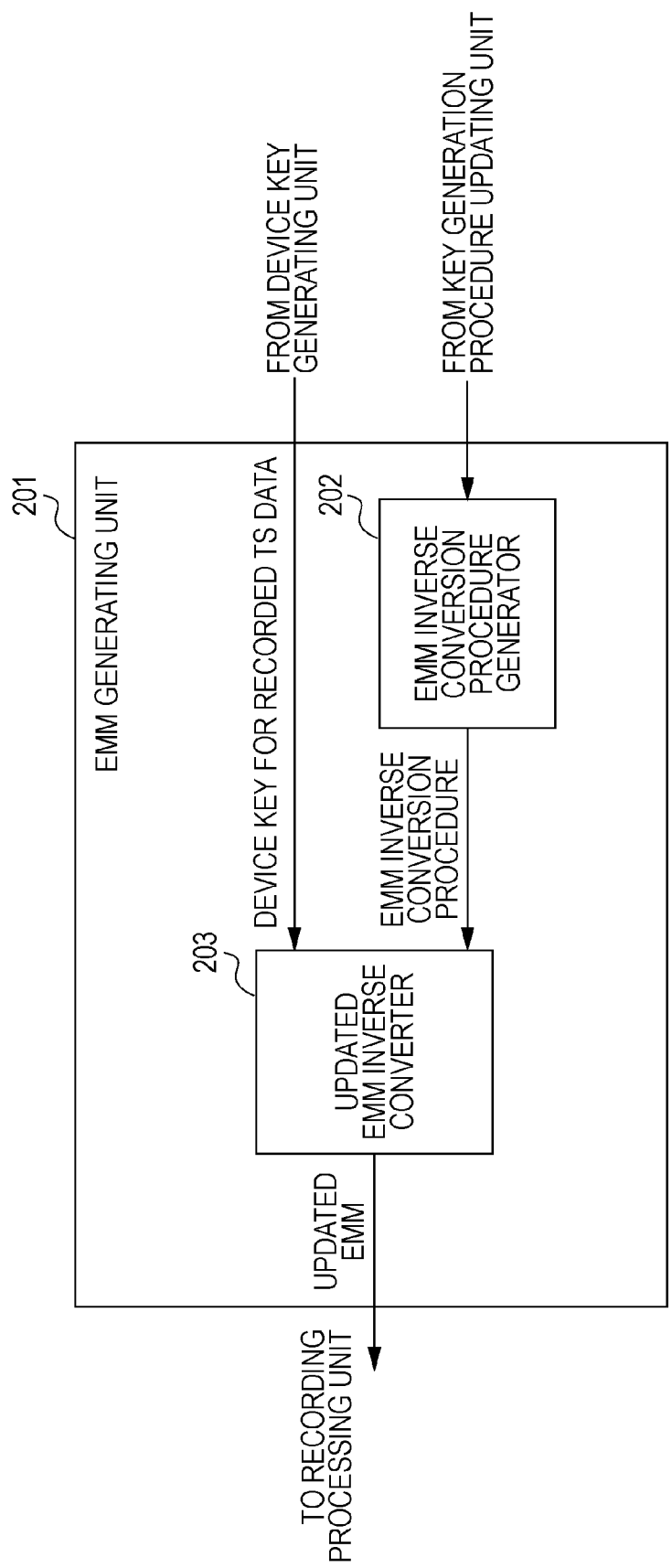
FIG. 4 is a block diagram showing a configuration of an EMM generating unit according to a second exemplary embodiment of the present invention.

As shown in FIG. 4, the EMM generating unit 201 includes an EMM inverse conversion procedure generator 202 and an updated EMM inverse converter 203. The EMM inverse conversion indicates processing for generating an EMM from a device key opposite to processing for generating a device key from an EMM. The EMM inverse conversion procedure generator 202 is supplied with an updated device key generation procedure acquired after execution of revoke and generates an updated EMM inverse conversion procedure. The updated EMM inverse converter 203 generates an updated EMM using the unupdated device key and the EMM inverse conversion procedure. The updated EMM is information from which a device key for recorded TS data can be restored using the updated device key generation procedure.

In this exemplary embodiment, a conditional access processing section includes a scramble key decrypting unit 109, a view permission determining unit 110, an EMM extracting unit 113, a work key decrypting unit 114, a work key memory 115, the EMM generating unit 201, a device key generating unit 116, and a key generation procedure updating unit 118.

A scrambling procedure executed at the time of reception and viewing of a broadcast wave is similar to that described in the first exemplary embodiment. In this exemplary embodiment, the EMM generating unit (corresponding to an EMM generating unit) 201 replaces the EMM of the recorded TS data with one corresponding to the updated device key generation procedure before updating the device key generation procedure.

Figure 5:
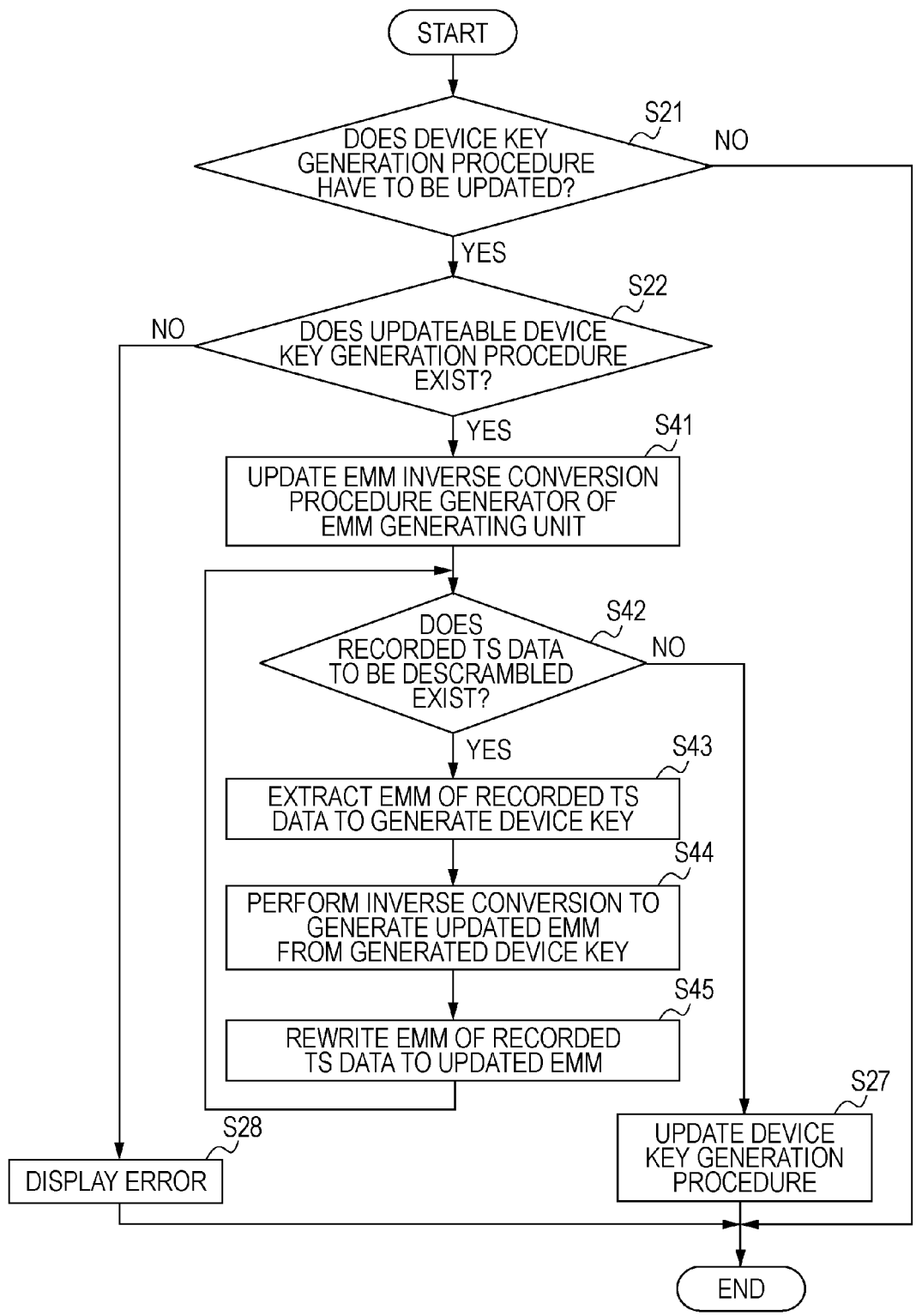
FIG. 5 is a flowchart showing an operation executed by a broadcast receiving apparatus according to a second exemplary embodiment of the present invention at the time of update of a device key generation procedure.

FIG. 5 is flowchart regarding processing executed on recorded TS data when a device key generation procedure is updated in response to execution of revoke. Processing executed after the start of the flowchart to S22 is the same as that of the first exemplary embodiment. If the updateable device key generation procedure does not exist (No at S22), an error is displayed at S28. The process then terminates.

If the updateable device key generation procedure exists (YES at S22), processing of the EMM generating unit 201 is updated to one corresponding to the device key generation procedure to be updated (S41). At this time, the EMM inverse conversion procedure generator 202 is updated but the device key generation procedure of the device key generating unit 116 is not updated.

Whether recorded TS data to be descrambled exists in a recorded data storage unit 112 is then detected (S42). Absence of the recorded TS data indicates that data using the unupdated device key generation procedure does not exist. Thus, the process terminates after update of the device key generation procedure (S27).

Figure 6:
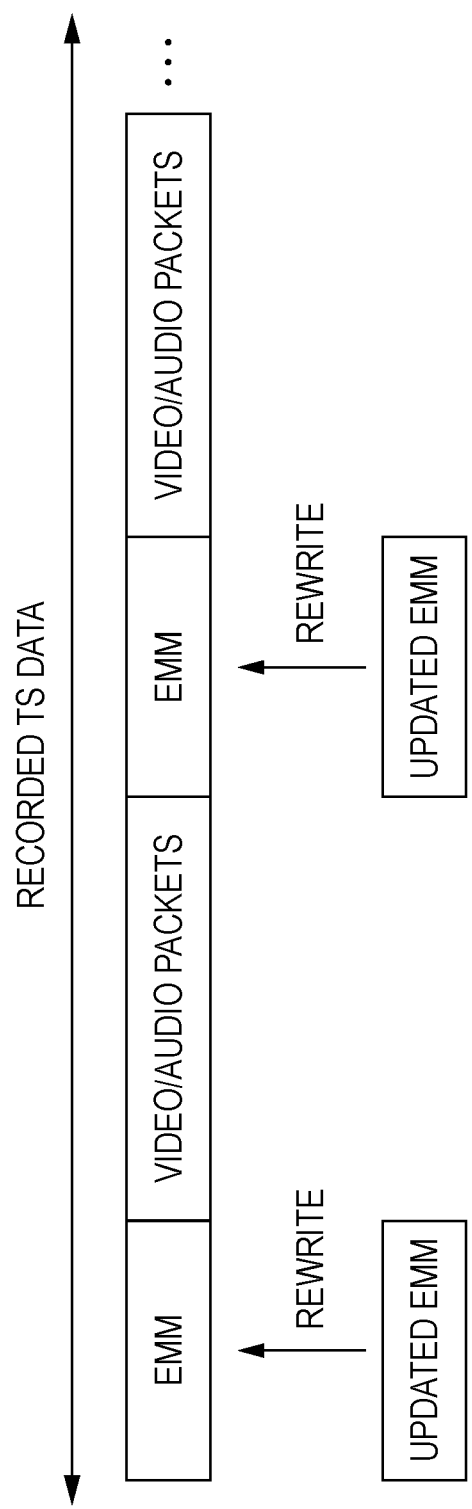
FIG. 6 is an explanatory diagram showing a structure of recorded TS data according to a second exemplary embodiment of the present invention.

If it is determined that the recorded TS data to be descrambled exists (YES at S42), processing starting from S43 is executed to realize reproduction since the recorded TS data can be no longer reproduced after the update of the device key generation procedure. More specifically, an EMM of the recorded TS data is extracted to generate a device key using the unupdated device key generation procedure (S43). An EMM corresponding to the updated device key generation procedure is generated from the generated device key (S44). The EMM contained in the conversion-target recorded TS data is rewritten to the EMM generated at S44 and the recorded TS data is stored in the recorded data storage unit 112 (S45). A recording processing unit (corresponding to an EMM rewiring unit) 107 rewrites the EMM. FIG. 6 shows a structure of EMMs and video/audio packets of recorded TS data. The recorded TS data whose EMM is rewritten at S45 can be descrambled using the updated device key generation procedure.

Processing at S42 to S45 are executed on all of scrambled recorded TS data stored in the recorded data storage unit 112. After the recorded TS data to be descrambled no longer exists (NO at S42), the device key generation procedure is updated (S27).

In the above-described manner, reproduction of recorded TS data can be realized while maintaining a copyright protection function even after update of the device key generation procedure. TS data is re-encrypted in the first exemplary embodiment. In contrast, in this exemplary embodiment, the copyright protection function is maintained by rewriting the EMM. Since rewriting of the EMM is easier conversion processing, processing time can be advantageously shortened and a configuration can be advantageously simplified.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-156901 filed on Jun. 16, 2008, which is hereby incorporated by reference herein in its entirety.

What is claimed is:

1. A broadcast receiving apparatus for receiving a digital broadcast signal to realize viewing of a content-protected broadcast program, the broadcast receiving apparatus comprising:

a processor; and
a memory comprising processor executable instructions which, when executed by the processor cause the processor to perform the method of:
receiving, via a digital broadcast signal, transport stream (TS) data including an entitlement control message (ECM), an entitlement management message (EMM) and scrambled program data;
storing, as recorded TS data, the transport stream (TS) data received by the receiver;
detecting execution of revocation to update key information contained in an EMM included in the transport stream (TS) data based on the revoke information contained in an EMM included in the transport stream (TS) data;
acquiring, in response to the detection of execution of revocation by the detector, encrypted device key information contained in an EMM included in the recorded TS data and generating a device key common to each model of broadcast receiving apparatus by applying non-updated device key generation procedure;
decrypting an encrypted work key contained in the EMM included in the recorded TS data, using a device key generated in the generating step;
decrypting an encrypted scramble key contained in the ECM included in the recorded TS data, using a work key decrypted in the step of decrypting the encrypted work key;
descrambling the scrambled program data included in the recorded TS data, using a scramble key decrypted in the step of decrypting the encrypted scramble key;
encrypting program data descrambled in the step of descrambling the scrambled program, using an encryption key unique to the broadcast receiving apparatus, and storing the encrypted program data in the storage; and
updating device key generation procedure used in the generating step, after the program data is encrypted using an encryption key unique to the broadcast receiving apparatus.

2. The apparatus according to claim 1, wherein the descrambling step decrypts the encrypted program data stored in the storage, using an encryption key unique to the broadcast receiving apparatus.

3. The apparatus according to claim 1, wherein, in a case where multiple pieces of recorded TS data are stored in the storage and execution of revocation is detected, the updating step updates device key generation procedure used by the device key generating step after the encrypting step encrypts the program data included in each of the multiple pieces of recorded TS data.

4. The apparatus according to claim 1, wherein the device key generation procedure is software for generating the device key.

5. A method for receiving a digital broadcast signal to realize viewing of a content-protected broadcast program, the method comprising:

receiving, via a digital broadcast signal, transport stream (TS) data including an entitlement control message (ECM), an entitlement management message (EMM) and scrambled program data;

storing, as recorded TS data, the transport stream (TS) data received in the receiving step;

detecting execution of revocation to update key information contained in an EMM included in the transport stream (TS) data;

acquiring, in response to the detection of execution of revocation, encrypted device key information contained in an EMM included in the recorded TS data and generating a device key common to each model of broadcast receiving apparatus by applying non-updated device key generation procedure;

decrypting an encrypted work key contained in the EMM included in the recorded TS data, using a device key generated in the generating step;

decrypting an encrypted scramble key contained in the ECM included in the recorded TS data, using a work key decrypted in the step of decrypting the encrypted work key;

descrambling the scrambled program data included in the recorded TS data, using a scramble key decrypted in the step of decrypting the encrypted scramble key;

encrypting program data descrambled in the step of descrambling the scrambled program, using an encryption key unique to the broadcast receiving apparatus, and storing the encrypted program data; and updating device key generation procedure used in the generating step, after the program data is encrypted using an encryption key unique to the broadcast receiving apparatus.

6. The method according to claim 5, wherein the descrambling step decrypts the stored encrypted program data, using an encryption key unique to the broadcast receiving apparatus.

7. The method according to claim 5, wherein, in a case where multiple pieces of recorded TS data are stored and execution of revocation is detected, the updating step updates device key generation procedure used by the device key generating step after the encrypting step encrypts the program data included in each of the multiple pieces of recorded TS data.

8. The method according to claim 5, wherein the device key generation procedure is software for generating the device key.

* * * * *